United States Patent [19]
Arii et al.

[11] Patent Number: 4,601,590
[45] Date of Patent: Jul. 22, 1986

[54] FLOATING BUSH BEARING

[75] Inventors: Seiji Arii; Katsusaku Yamamoto, both of Ube, Japan

[73] Assignee: Ube Industries, Yamaguchi, Japan

[21] Appl. No.: 766,740

[22] Filed: Aug. 16, 1985

[30] Foreign Application Priority Data

Aug. 31, 1984 [JP] Japan .................. 59-180336

[51] Int. Cl.$^4$ ............................. F16C 17/02
[52] U.S. Cl. ........................ 384/99; 384/286;
　　　　　　　　　　　　　　　　384/901; 384/906
[58] Field of Search .............. 384/99, 286, 901, 906,
　　　　　　　　　　　　　384/398, 397, 398; 308/DIG. 4

[56] References Cited

U.S. PATENT DOCUMENTS

| 4,427,309 | 1/1984 | Blake | 308/DIG. 4 |
| 4,474,484 | 10/1984 | MacInnes et al. | 308/DIG. 4 |
| 4,553,855 | 11/1985 | De Choudhury | 384/99 |
| 4,560,325 | 12/1985 | Yoshioka et al. | 384/901 |

OTHER PUBLICATIONS

Japanese Patent Publication No. Sho 48-15536.

Primary Examiner—Lenard A. Footland
Attorney, Agent, or Firm—Townsend and Townsend

[57] ABSTRACT

A floating bush bearing comprising: a pair of an outer member having a cylindrical inner surface and an inner member having a cylindrical outer surface which is inserted in the outer member substantially coaxially, one of said pair of outer and inner members being rotatable and another member being fixed; a floating bush having inner and outer cylindrical surfaces fitted between the outer and inner members; a substantially cylindrical hole which is defined by opposed substantially semicylindrical outer and inner grooves which are formed in the opposed surfaces of the rotatable member and the floating bush; and a small cylindrical pin which is fitted into the hole.

7 Claims, 8 Drawing Figures

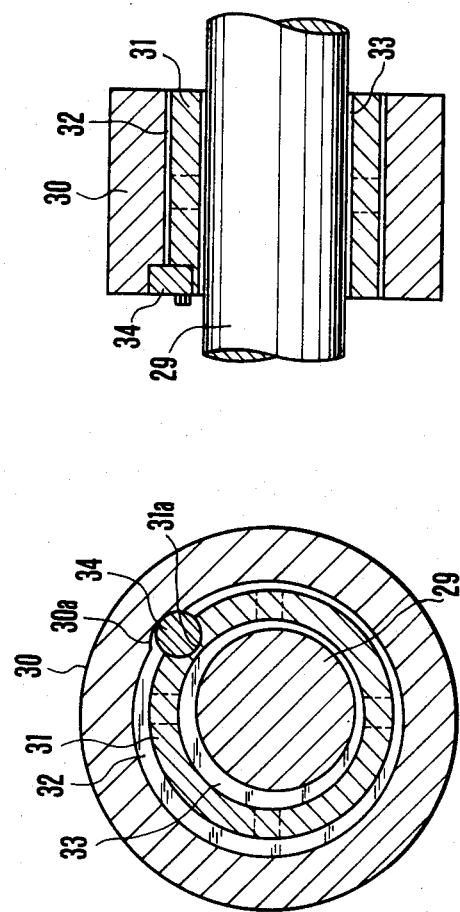

FLOATING BUSH BEARING

BACKGROUND OF THE INVENTION

The present invention relates to a floating bush bearing.

A floating bush bearing comprises a stationary bush, a rotary shaft and a floating bush rotatably fitted therebetween and is intended to improve the bearing capacity so that heat produced may be minimized and vibration may be prevented. FIG. 1 is a cross sectional view of a prior art floating bush bearing. A rotary shaft 2 which is driven by a prime mover is supported through a rotatable floating bush 3 in a stationary bush 1 securely fitted into a frame or the like. The cylindrical wall of the floating bush 3 is formed with a plurality of oil holes and the inner wall surface of the floating bush 3 is formed with a circular groove in communication with these oil holes. When a lubricating oil is fed into the space between the stationary and floating bushes 1 and 3, it is distributed through the oil holes and the circular oil groove over the whole inner wall surface of the floating bush 3 so that oil films 4 and 5 are formed over the outer and inner wall surfaces of the floating bush 3, respectively.

Upon rotation of the rotary shaft 2, it floats because of the oil film 5 formed over the inner wall surface of the floating bush 3 and the floating bush 3 is drawn by the inner oil film 5 and is therefore rotated. In this case, the floating bush 3 floats and rotates between the outer and inner oil films 4 and 5 so that it is well lubricated and less heat is produced. That is, the heat produced due to the viscosity of the oil films is in proportion to the square of a relative sliding speed if the oil films have the same thickness. Therefore, if a floating bush bearing instead of a conventional bearing having only one oil film is used and the floating bush 3 rotates at a speed one half (½) of that of the rotary shaft, the heat produced from each of the two oil films 4 and 5 of the floating bush 3 becomes ¼ of the heat produced in the conventional bearing. Even if the calorific values of the oil films 4 and 5 are summed, the overall heat produced is ony ½ of the heat produced in the conventional bearing.

As described above, if the floating bush 3 rotates at a speed one half (½) of that of the rotary shaft 2, the calorific value becomes ½ as compared with the conventional bearing, so that the bearing performance is improved. However, in practice, as many literatures report, the floating bush 3 is difficult to be rotated and hardly rotates especially when the rotary shaft 2 starts rotating. The reason why it is difficult to cause the rotation of the floating bush 3 is as follows:

That is, upon rotation of the rotary shaft 2, the inner oil film 5 is formed and the floating bush 3 is drawn by the inner oil film 5 and tends to rotate. The force for causing the rotation of the floating bush 3 is a dynamic frictional force, while a static frictional force which is far greater than the dynamic frictional force is produced between the floating bush 3 and the stationary bush 1 prior to the formation of the outer oil film 4. As described above, the performance of the conventional floating bush bearing is not so satisfactory that it has not been widely used in practice.

Japanese Patent Publication No. 48-15536 discloses an intermediate gear device which is substantially similar in construction to the floating bush bearing. FIG. 2 is a longitudinal sectional view thereof. A driving 7 and an output shaft 8 are supported by frames 6 in coaxial relationship. A planet gear shaft 10 is supported in parallel with the driving and output shafts 7 and 8 by a supporting frame 9 integral with the output shaft 8. A planet gear 12 which is in mesh with a driving gear 11 integral with the driving shaft 7 is carried through an auxiliary gear 13 by the planet gear shaft 10. The auxiliary gear 13 is also in mesh with the driving gear 11. Reference numerals 14 and 15 denote an internal gear and a spacer, respectively. A plurality of the planet gear shafts 10, the planet gears 12, the auxiliary gears 13 and the spacers 15 are equiangularly disposed.

When the driving shaft 7 is rotated, the planet gears 12 rotate themselves, while revolving around the driving gear 11 so that the output shaft 8 is rotated in unison with the supporting frame 9. When the intermediate gear device of the type described is compared with the floating bush bearing as shown in FIG. 1, it is seen that the planet gear shaft 10, which is not rotated, corresponds to the stationary bush 1 and that the auxiliary gear 13 which is fitted over the planet gear shaft 10 corresponds to the floating bush 3. In addition, the planet gear 12, which is in mesh with the auxiliary gear 13 and rotates, corresponds to the rotary shaft 2. Therefore, from the standpoint of construction and in view of the fact that a lubricating oil is supplied to the gears in mesh with each other, the intermediate gear device of the type described above may be regarded as a floating bush bearing. In the intermediate gear device, as the auxiliary gear 13 is in mesh with the driving gear 11 and is rotated at the same speed as the planet gear 12, the auxiliary gear 13 functions as the floating bush 3, as described above. As a result, less heat is produced and machining errors can be absorbed. Furthermore, because the oil films serve to prevent vibration, the load can be equally distributed among the planet gears 12.

However, in the intermediate gear device of the type described above, the force for causing the rotation of the auxiliary gear 13 is too small so that the static deflections of the teeth of the aux1liary gear 13 become considerably less than machining errors. As a result, when one tooth leaves from another tooth and engages with the next tooth, vibrations are caused so that the tooth surfaces are worn out and broken.

SUMMARY OF THE INVENTION

In view of the above, the primary object of the present invention is to provide a floating bush bearing in which a floating bush can be rotated in unison with a rotary body almost without causing any dynamic load so that less heat is produced, the vibration can be prevented and the performance of the bearing can be improved.

A floating bush bearing in accordance with the present invention comprises: a pair of outer and inner members, one of said pair of outer and inner members being fixed while the other being rotatable, said outer member having a cylindrical inner surface while said inner member having an outer cylindrical surface and being fitted into said outer member substantially in coaxial relationship therewith; a floating bush which is fitted between said outer and inner members and which has outer and inner cylindrical surfaces; a flowing liquid filled in the space defined between said outer member and said floating bush and the space defined between said floating bush and said inner member; a pair of substantially semi-cylindrical outer groove and a substantially semicylindrical inner groove formed in the opposed surfaces of the member, which is rotatable, of said a pair of outer and inner members and said floating bush, the axis of said substantially semicylindrical outer and inner grooves being extended substantially in parallel with the axis of the member which is rotatable, one of said a pair of semicylindrical outer and inner grooves being slightly greater in diameter than another of said a pair of substantially semicylindrical inner and outer grooves; and a pin which is fitted into a substantially cylindrical hole defined by said substantially semicylindrical outer and inner grooves which are aligned with each other, the diameter of said pin being substantially equal to the diameter of one of said a pair of substantially semicylindrical outer and inner grooves, which is smaller in diameter than another of said a pair of substantially semicylindrical inner and outer grooves.

BRIEF DESCRIPTION OF THE DRAWINGS

FIG. 5 is a cross sectional view of a second embodiment of the present invention;

FIG. 6 is a longitudinal sectional view thereof;

DETAILED DESCRIPTION OF THE PREFERRED EMBODIMENTS

The preferred embodiments of the floating bush bearing in accordance with the present invention will be described in detail with reference to the accompanying drawings.

Figure 3:
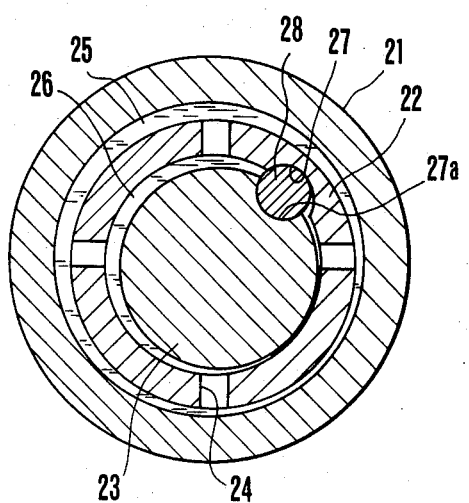
FIG. 3 is a cross sectional view of a first embodiment of the present invention.
Figure 4:
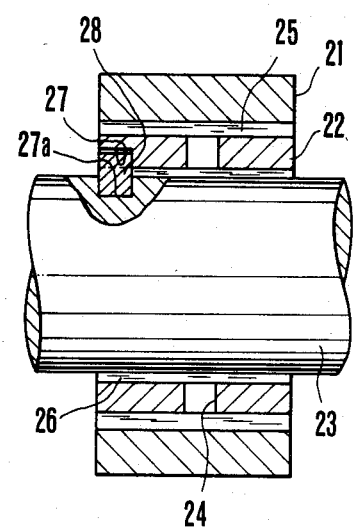
FIG. 4 is a longitudinal sectional view thereof.

FIGS. 3 and 4 show a first embodiment of the present invention. FIG. 3 is a cross sectional view thereof, while FIG. 4 is a longitudinal sectional view thereof. A cylindrical stationary bush 21 is securely fitted into a machine frame and a cylindrical floating bush 22 is rotatably fitted into the stationary bush 21. A rotary shaft 23, which is an example of the rotor, is supported by the floating bush 22. The space between the rotary shaft 23 and the floating bush 22 and the space between the floating bush 22 and the stationary bush 21 are intercommunicated with each other through a plurality of oil holes 24. A lubrication oil, which is supplied from an oil inlet (not shown), fills the space between the rotary shaft 23 and the floating bush 22 and the space defined between the floating bush 22 and the stationary bush 21, so that oil films 25 and 26, which are intercommunicated with each other through the oil holes 24, are formed. The inner diameter of the floating bush 22 is slightly greater than the outer diameter of the rotary shaft 23, while the outer diameter of the floating bush 22 is slightly smaller than the inner diameter of the stationary bush 21. Semicylindrical holes 27 and 27a which define a substantially cylindrical hole as a whole are formed in the inner cylindrical surface of the floating bush 22 and the outer cylindrical surface of the rotary shaft 23, respectively. A pin 28 is fitted into the substantially cylindrical space formed by the opposed semicylindrical pin holes 27 and 27a, so as to limit the relative rotation between the floating bush 22 and the rotary shaft 23. It should be noted that the radius of the semicylindrical pin hole 27a on the side of the rotary shaft 23 is substantially equal to that of the pin 28, but the radius of the pin hole 27 on the side of the floating bush 22 is greater than the radius of the pin 28, because a gap for the oil film 26 between the rotary shaft 23 and the floating bush 22 is taken into consideration. For instance, when the outer diameter of the rotary shaft 23 is 175 mm and if the rotary shaft 23 and the floating bush 22 are radially spaced apart from each other by about 0.5 mm, the radius of the pin 28 and the radius of the pin hole 27a are 15 mm, while the radius of the pin hole 27 is 16.25 mm. The length of the pin 28 is relatively short and, for example, is 20 mm.

Next, the mode of operation of the first embodiment with the above-described construction will be described. When the rotary shaft 23 is rotated, the floating bush 22 is forced to rotate in unison with the rotary shaft 23 because the relative rotation between the rotary shaft 23 and the floating bush 22 is restricted by means of the pin 28, so that the oil films 25 and 26 are formed over the outer and inner cylindrical surfaces of the floating bush 22. As a result, the floating bush 22 floats and rotates between these two oil films 25 and 26.

Because the radius of the pin 28 is slightly smaller than that of the pin hole 27 on the side of the floating bush 22 and there exists a small clearance between the outer cylindrical surface of the rotary shaft 23 and the inner cylindrical surface of the floating bush 22, as the rotary shaft 23 rotates, the point of contact between the pin 28 and the pin hole 27 gradually moves while the floating bush 22 is rotated.

According to the operation described above, the floating bush bearing, while maintains its bearing performance, fully exhibits the essential features of the floating bush bearing that the heat produced is less and that the vibration can be prevented.

The floating bush bearing with the abovedescribed construction is simple to fabricate with less machining errors. Furthermore, unlike the engagement between the gears, no impact is produced so that no vibration is caused and consequently the smooth power transmission can be ensured. The dynamic load applied to the pin 28 is very small.

FIG. 5 is a cross sectional view of a second embodiment of the present invention while FIG. 6 is a longitudinal sectional view thereof. FIGS. 5 and 6 correspond to FIGS. 3 and 4 respectively. In the second embodiment to be described below, the relationship between a stationary body and a rotary body is opposite to that of the first embodiment. More particularly, a shaft 29 is stationarily supported by machine frames or the like and a rotary cylinder 30 is fitted over the stationary shaft 29 through a floating bush 31. Except these arrangements, the second embodiment is substantially similar in construction with the first embodiment described above with reference to FIGS. 3 and 4. That is, oil films 32 and 33 are formed over the outer and inner cylindrical surfaces, respectively, of the floating bush 31; a pin hole 30a is formed at the inner cylindrical surface of the rotary cylinder 30, while a pin hole 31a is formed at the outer cylindrical surface of the floating bush 31; and a pin 34 is fitted into these pin holes 30a and 31a.

In operation, upon rotation of the rotary cylinder 30, the floating bush 31 is caused to rotate in unison with the rotary cylinder 30 and the oil films 32 and 33 are formed. Thus the effects, features and advantages of the second embodiment are substantially similar to those of the first embodiment described above.

Figure 1:
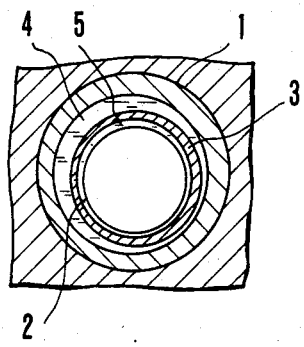
FIG. 1 is a cross sectional view of a prior art floating bush bearing.
Figure 2:
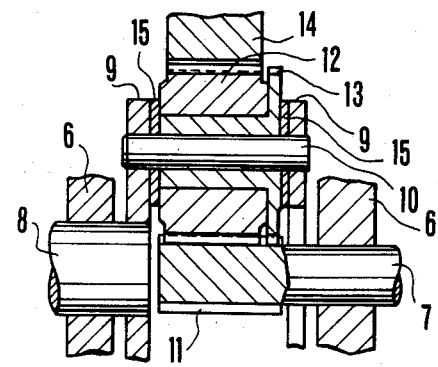
FIG. 2 is a longitudinal sectional view of another prior art floating bush bearings.
Figure 7:
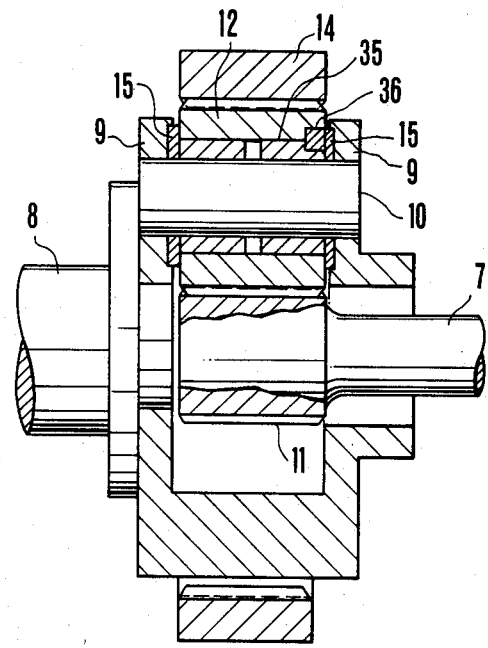
FIG. 7 is a longitudinal sectional view of a third embodiment of the present invention.

FIG. 7 shows a third embodiment of the present invention and is a longitudinal sectional view of a floating bush bearing in accordance with the present invention used in conjunction with a planetary gear apparatus. Same reference numerals are used to designate similar parts throughout FIGS. 2 and 7 and the component parts which have been already explained shall not be described further in this embodiment. In the third embodiment, the planet gear 12 is carried through a floatng bush 35 by the planet gear shaft 10 which in turn is securely supported by the frames 9. The third embodiment is an application or modification of the second embodiment described above with reference to FIGS. 5 and 6. More specifically, a pin 36 is rotatably fitted into the mating semicylindrical grooves formed at the outer cylindrical surface of the floating bush 35 and the inner cylindrical surface of the planet gear 12. Here as elsewhere, oil films are formed over the outer and inner cylindrical surfaces of the floating bush 35.

Figure 8:
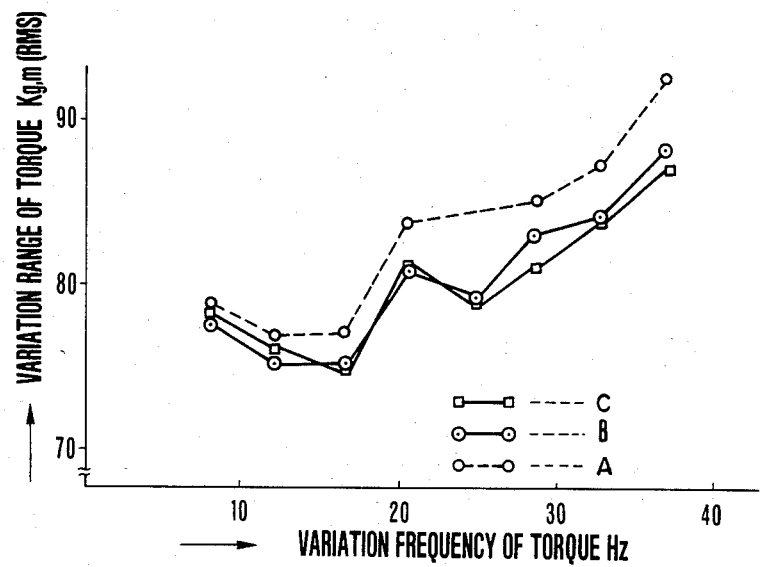
FIG. 8 is a graph used to explain the effects of the third embodiment shown in FIG. 7.

FIG. 8 is a graph which shows the relationship between the torque variation frequency and the torque variation range and which is used to explain the effect for absorbing torque variations in the third embodiment described above with reference to FIG. 7. The data shown were obtained by measuring the torque variation range of a shaft relative to the torque variation with a special power-circulation type gear tester. The torque variation in Hz is plotted along the abscissa while the torque variation range in kg.m along the ordinate. The characteristic curve A was obtained when no floating bush bearing was used; the characterisitc curve B was obtained when the floating bush bearing having the auxiliary gear of the intermediate gear device described with reference to FIG. 2; and the characteristic curve C was obtained when the floating bush bearing as shown in FIG. 7 was used.

It is seen that, when the floating bush bearing is used, the torque variation range is small as indicated by the characteristic curve B or C. This means that the floating bush serves to prevent vibration. It is seen that the prior art floating bush bearing having the auxiliary gear has the substantially same effect as the floating bush bearing according to the present invention. However, the costruction is apparently complicated and the mass is great. As a result, the force required for forcibly driving is considerably greater than the force required in the present invention. The reason is that, as described above, the driving force mainly consists of a dynamic load which is in proportion to the mass of the rotary body.

In case of the prior art, as indicated by the curve B, the driving force acts on a point where a ridge and a valley contact with each other, because the external gear is used. On the other hand, in the case of the present invention, as shown in FIG. 5, the driving force acts at a point where the radius of the pin 34 and th pin hole 30a on the side of the rotary body 30 contact with each other. Accordingly, the advantage in the strength is obtained. For instance, in the experiments conducted to obtain the data shown in FIG. 8, the data B was obtained by using the auxiliary gear and its mating gear which have the equal radius of a pitch circle of 150 mm, the pressure angle of 20° and the tooth width of 40 mm. In the case of the present invention, the radius of the pin hole 30a is 15 mm; the radius of the pin hole 30a is 16.25 mm; and the length of the pin 34 is 20 mm. In the respective cases, the contact stresses are calculated as follows:
In the case of the prior art B, $$\sigma = 60.6 \sqrt{\frac{W}{\frac{150}{2} \tan 20° \times 40}} = 1.83 \sqrt{W}$$

In the case of the present invention C, $$\sigma = 60.6 \sqrt{\frac{W}{\frac{16.25 \times 15}{16.25 - 15} \times 20}} = 0.97 \sqrt{W}$$

where W is the driving force and the constant 60.6 is determined depending upon Young's modulus and Poisson ratio of a material used. As described above, according to the present invention, even though a small pin is used, the contact stress can be reduced by about one half so that the present invention is very advantageous in terms of strength. Furthermore, the present invention is advantageous because, as described above, the load W in the above equation can be decreased.

So far the pins 28 and 34 have been described as being solid cylinder, but it is to be understood that the pin may be in the form of a short hollow pipe. Moreover, the short hollow pipe may be in the form of C in cross section so that the flexibility of the pipe can be improved. In addition, a pin may be inserted into a short pipe in the form of C in cross section. Furthermore, a plurality of circumferentially spaced apart pins 22 or 31 may be used. In the first, second and third embodiments, only one floating bush 22 or 31 is used, but it is to be understood that a plurality of floating bushes are disposed in the coaxial relationship and are interconnected with each other by means of pins.

As described above, in a floating bush bearing in accordance with the present invention, the floating bush is caused to rotate in unison with the rotary body almost without causing a dynamic load with very simple and high reliable construction such that a cylindrical floating bush is fitted between a rotary body and a fixed body and a pin for restricting the relative rotation between the floating bush and the rotary body is embedded into the mating surfaces of the floating bush and the rotary body. Thus the performance of the floating bush bearing, that is heat reduction and vibration prevention, can be considerably improved and the floating bush bearing can be used at a high speed rotation under a heavy load.

What is claimed is:
1. A floating bush bearing comprising:
   a pair of outer and inner members, one of said pair of outer and inner members being fixed while the other being rotatable, said outer member having a cylindrical inner surface while said inner member having an cylindrical outer surface and being fitted into said outer member substantially in coaxial relationship therewith;
   a floating bush which is fitted between said outer and inner members and which has outer and inner cylindrical surfaces;
   a flowing liquid filled in the space defined between said outer member and said floating bush and the space defined between said floating bush and said inner member;

a pair of substantially semicylindrical outer groove and a substantially semicylindrical inner groove formed in the opposed surfaces of the member which is rotatable of said pair of outer and inner members and said floating bush, the axis of said substantially semicylindrical outer and inner grooves being extended substantially in parallel with the axis of the member which is rotatable, one of said pair of substantially semicylindrical outer and inner grooves being slightly greater in diameter than another of said pair of substantially semicylindrical outer and inner grooves; and a pin which is fitted into a substantially cylindrical hole defined by said substantially semicylindrical outer and inner grooves which are aligned with each other, a diameter of said pin being substantially equal to the diameter of one of said a pair of substantially semicylindrical outer and inner grooves which is smaller in diameter than another of said pair of substantially semicylindrical outer and inner grooves.

2. A floating bush bearing as set forth in claim 1 wherein said pair of semicylindrical outer and inner grooves and said pin are substantially equal in length to each other.

3. A floating bush bearing as set forth in claim 1 wherein said outer member is held stationary and is hollow; said inner member is rotatably fitted into said outer member and is in the form of a solid cylinder; said floating bush is in the form of a ring and is fitted into the space defined between said outer and inner member; and said pin is embedded into the inner cylindrical surface of said floating bush and the outer cylindrical surface of said inner member.

4. A floating bush bearing as set forth in claim 1 wherein said inner member is held stationary and is solid; said floating bush is fitted over said inner member; said outer member is hollow, is fitted over said floating bush and is rotatable; and said pin is embedded into the cylindrical outer surface of said floating bush and the cylindrical inner surface of said outer member.

5. A floating bush bearing as set forth in claim 1 wherein the diameter of said outer groove is greater than that of said inner groove.

6. A floating bush bearing as set forth in claim 1 wherein a plurality of pins and substantially cylindrical holes of the type described are provided.

7. A floating bush bearing as set forth in claim 1 wherein said floating bush bearing is used in conjunction with a planetary gear apparatus; and said outer member is a planet gear which is rotatable, while said inner member is a planet gear shaft which is fixed.

* * * * *